(12) United States Patent
Ruan et al.

(10) Patent No.: US 10,996,996 B2
(45) Date of Patent: *May 4, 2021

(54) IMPLEMENTING MULTIPLE CONTENT MANAGEMENT SERVICE OPERATIONS

(71) Applicant: EMC IP Holding Company LLC, Hopkinton, MA (US)

(72) Inventors: Wei Ruan, Shanghai (CN); Wei William Zhou, Shanghai (CN); Jason Muhu Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,316

(22) Filed: Jan. 28, 2020

(65) Prior Publication Data
US 2020/0159596 A1    May 21, 2020

Related U.S. Application Data

(63) Continuation of application No. 15/097,978, filed on Apr. 13, 2016, now Pat. No. 10,545,801.

(30) Foreign Application Priority Data

Apr. 16, 2015 (CN) .......................... 2015101845936

(51) Int. Cl.
*G06F 9/48* (2006.01)
*G06F 9/54* (2006.01)
*G06F 9/46* (2006.01)

(52) U.S. Cl.
CPC ................ *G06F 9/54* (2013.01); *G06F 9/466* (2013.01); *G06F 2209/541* (2013.01)

(58) Field of Classification Search
None
See application file for complete search history.

(56) References Cited

U.S. PATENT DOCUMENTS

| | | | |
|---|---|---|---|
| 7,484,219 B2 | 2/2009 | Mitra |
| 7,657,537 B1 | 2/2010 | Corbett |
| 8,280,917 B1 | 10/2012 | Wei et al. |
| 8,332,851 B2 | 12/2012 | Ostermeier et al. |
| 8,607,234 B2 | 12/2013 | Memik et al. |
| 8,650,224 B2 | 2/2014 | Wei et al. |
| 8,776,064 B2 | 7/2014 | Fee et al. |
| 9,098,346 B2 | 8/2015 | Robb et al. |

(Continued)

OTHER PUBLICATIONS

Ibrahim et al. "Remote Batch Invocation for Web Services Document-OrientedWeb Services with Object-Oriented Interfaces", 2009 IEEE, pp. 190-199.*

(Continued)

*Primary Examiner* — Van H Nguyen
(74) *Attorney, Agent, or Firm* — Brian J. Colandreo; Mark H. Whittenberger; Holland & Knight LLP

(57) ABSTRACT

Embodiments of the present disclosure disclose an apparatus and a method for implementing multiple content management service operations by sending a batch service request for a batch, wherein the batch comprises multiple content management service operations; and receiving a batch service response, wherein the batch service response indicates at least one of a state of the batch and a result from executing the batch.

14 Claims, 6 Drawing Sheets

(56) References Cited

U.S. PATENT DOCUMENTS

| | | |
|---|---|---|
| 10,545,801 B2 | 1/2020 | Ruan et al. |
| 2003/0093425 A1 | 5/2003 | Shelton |
| 2004/0103098 A1 | 5/2004 | Mitra |
| 2008/0082586 A1 | 4/2008 | Jasik et al. |
| 2009/0030906 A1 | 1/2009 | Doshi et al. |
| 2009/0178042 A1 | 7/2009 | Mehta et al. |
| 2012/0330917 A1 | 12/2012 | Wei et al. |
| 2014/0059194 A1 | 2/2014 | Robb et al. |
| 2014/0282556 A1 | 9/2014 | Fee et al. |
| 2016/0306660 A1 | 10/2016 | Ruan et al. |

OTHER PUBLICATIONS

Tilevich et al. "Explicit Batching for Distributed Objects", 2009 IEEE, pp. 543-552.*

Non-Final Office Action issued in related U.S. Appl. No. 15/097,978 dated Jul. 3, 2017.

Final Office Action issued in related U.S. Appl. No. 15/097,978 dated Apr. 5, 2018.

Non-Final Office Action issued in related U.S. Appl. No. 15/097,978 dated Sep. 21, 2018.

Final Office Action issued in related U.S. Appl. No. 15/097,978 dated Apr. 19, 2019.

Notice of Allowance issued in related U.S. Appl. No. 15/097,978 dated Sep. 10, 2019.

Notification of First Office Action issued in related CN Application Serial No. 2015101845936 dated Sep. 28, 2018.

Notification of the Second Office Action issued in related CN Application Serial No. 2015101845936 dated May 22, 2019.

Sung, L. G. Alex et al., "Autonomic Resource Management for a Cluster that Executes Batch Jobs", 2006 IEEE, University of Waterloo, Waterloo, Canada, 10 pages.

* cited by examiner

IMPLEMENTING MULTIPLE CONTENT MANAGEMENT SERVICE OPERATIONS

RELATED APPLICATION

The subject application is a continuation of U.S. application Ser. No. 15/097,978; filed on Apr. 13, 2016, which claims priority from Chinese Patent Application Number CN2015101845936, filed on Apr. 17, 2015 at the State Intellectual Property Office, China, titled "METHOD AND APPARATUS FOR IMPLEMENTING MULTIPLE CONTENT MANAGEMENT SERVICE OPERATIONS," the contents of which are herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present disclosure generally relate to execution content management service operations.

BACKGROUND

Generally, Representational state transfer (REST) software architecture is a general solution for designing a new programmable product (e.g., the content management solution for the ECG of EMC) and for applying an on-premise product to a cloud. In RESTful services, a batch service has a unique value, because it creates a capability of converging multiple operations into one user transaction, thereby enhancing service efficiency and reducing communication overheads. The batch in Restful services refers to the execution of a series of resource operations on a RESTful service using specific batch resources.

In computer science, there are a number of common batch Hyper Text Transfer Protocol (HTTP) application program interfaces (APIs), e.g., Open Data Protocol (ODATA) of the Organization for the Advancement of Structured Information Standards (OASIS) that describes how to create and access a RESTful service.

SUMMARY

Exemplary embodiments of the present disclosure provide a method and apparatus for implementing multiple content management service operations. One embodiment may include a method for implementing multiple content management service operations by sending a batch service request for a batch, wherein the batch may include multiple content management service operations; and receiving a batch service response, wherein the batch service response indicates at least one of a state of the batch and a result from executing the batch.

BRIEF DESCRIPTION OF THE DRAWINGS

Further understanding of the present disclosure is provided using the accompanying drawings that constitute part of the present disclosure. The schematic embodiments of the present disclosure and their explanations are used for interpreting the present disclosure, not constituting improper limitation to the present disclosure. In the accompanying drawings.

In respective figures, same or like reference numerals are used to represent the same or like components.

DETAILED DESCRIPTION

Figure 1:
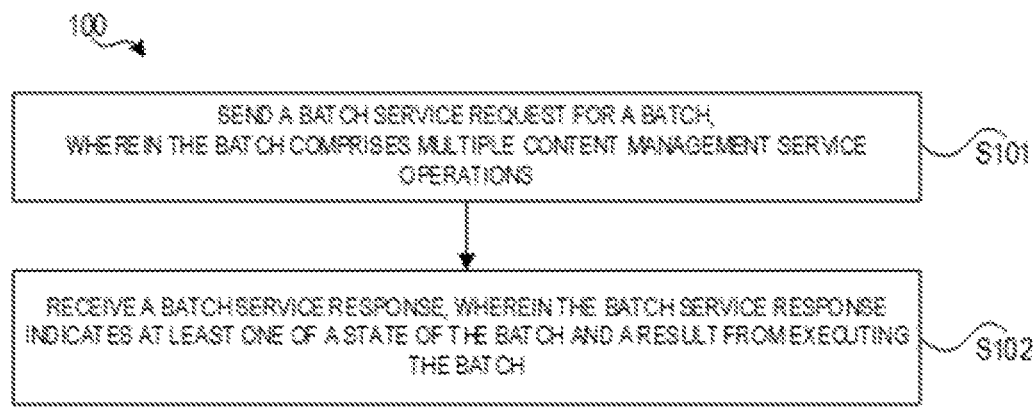
FIG. 1 shows an exemplary flow diagram of a method 100 for implementing multiple content management service operations according to embodiments of the present disclosure.

Hereinafter, various exemplary embodiments of the present disclosure will be described in detail with reference to the accompanying drawings. It should be noted that these drawings and depictions only relate to exemplary embodiments. It should be pointed out that based on the descriptions infra, alternative embodiments of the structures and methods disclosed here would be easily contemplated, and such alternative embodiments may be used without departing from the principle as claimed in the present disclosure. It should be understood that providing these exemplary embodiments is only for enabling those skilled in the art to better understand and then implement the present disclosure, not intended to limit the scope of the present disclosure in any manner.

References in the specification to "one embodiment", "an embodiment", "a preferred embodiment" etc., indicate that the embodiment described may include a particular feature, structure, or characteristic, but every embodiment may not necessarily include the particular feature, structure, or characteristic. Moreover, such phrases are not necessarily referring to the same embodiment. It should also be understood that various terminology used herein is for the purpose of describing particular embodiments only and is not intended to be liming of the disclosure. As used herein, the singular forms "a", "an" and "the" may include the plural forms, unless the context clearly indicates otherwise. It will be further understood that the terms "comprises", "has" and "including" used herein, specify the presence of stated features, elements, and/or components etc., but do not preclude the presence of one or more other features, elements, components and/or combinations thereof. For example, the term "multiple" used here indicates "two or more"; the term "and/or" used here may comprise any or all combinations of one or more of the items listed in parallel. Definitions of other terms will be specifically provided in the following description. Furthermore, in the following description, some functions or structures well-known to those skilled in the art will be omitted in order not to obscure embodiments of the disclosure in the unnecessary details.

Embodiments of the present disclosure will be specifically described with a batch in a RESTful service as an example. In some embodiments, a batch in a RESTful service refers to an execution of a series of resource operations on a RESTful service using specific batch resources. In some embodiments, any batch systems may have some common behavior besides their own unique features. In some embodiments, needs of a batch may vary dependent on different resource operations, different user scenarios, or different products.

Example embodiments of the present disclosure provide a method and apparatus for implementing multiple content management service operations. One embodiment may include a method for implementing multiple content management service operations. A further embodiment may include sending a batch service request for a batch, wherein the batch may include multiple content management service operations. A further embodiment may include receiving a batch service response, wherein the batch service response indicates at least one of a state of a batch and a result from executing a batch. In a further embodiment, none of the APIs have been designed specifically for a content management system; and consequently, they do not have a complete batch options required by the content service system, e.g., transaction options, error handling options, content binary transfer options, etc. In a further additional embodiment, these APIs may rely on specific message formats, e.g., extensible markup language (XML) or JavaScript Object Notation (JSON). In some embodiments, content management systems may have RESTful batch APIs only when they have a built-in batch capability in their underlying systems. In a further embodiment, it may be desirable for a general batch method for implementing multiple operations of content management services to be applied to existing content management systems that may not have an built-in batch capability under a RESTful layer.

In one embodiment, sending a batch service request for a batch may include sending one of the following batch service requests: creating and executing a new batch; getting all created batches; getting supported batch features; getting a batch; changing a state of a batch; and removing a batch. In another embodiment, getting supported batch features may include getting one or more of the following features: transactional, non-transactional or both; synchronous, asynchronous, or both; sequential, non-sequential or both; failing-on-error, continuing-on-error, or both; removing-on-complete, retaining-on-complete or both; allowing to halt an asynchronous batch or not; and what resources may be allowed for batching or what resources may not be allowed for batching.

In a further embodiment, the state of the batch may include one of the following: initial state, running state, halted state and finished state. In a further embodiment, sending a batch service request for a batch may include sending a batch service request indicating an operating mode of a batch, wherein an operating mode may include one or more of the following: transactional mode or non-transactional mode; synchronous mode or asynchronous mode; sequential mode or non-sequential mode; failing-on-error mode or continuing-on-error mode; removing-on-complete mode or retaining-on-complete mode.

In yet a further embodiment, a batch service request may include a request for each content management service operation, wherein a request may include an attachment element, an attachment element may cause content related to each content management service operation to be separately uploaded or downloaded. In a further embodiment, content related to each content management service operation may be of a text type or other media type. In a further embodiment, receiving a batch service response may include receiving one of the following batch service responses: a response to creating and executing a new batch; a response to getting all created batches; a response to getting supported batch features; a response to getting a batch; a response to changing a state of a batch; and a response to removing a batch.

One embodiment may include a method for implementing multiple content management service operations. A further embodiment may include receiving a batch service request for a batch, wherein a batch may include multiple content management service operations. A further embodiment may include executing a batch in response to a batch service request. A further embodiment may include sending a batch service response, wherein a batch service response indicates at least one of a state of a batch and a result from executing a batch.

In one embodiment, executing a batch in response to a batch service request may include executing a batch based on an operating mode of a batch indicated by a batch service request. In a further embodiment an operating mode may include one or more of the following: transactional mode or non-transactional mode; synchronous mode or asynchronous mode; sequential mode or non-sequential mode; failing-on-error mode or continuing-on-error mode; removing-on-complete mode or retaining-on-complete mode.

One embodiment may include an apparatus for implementing multiple content management service operations. A further embodiment may include a request sending unit that may be configured to send a batch service request for a batch, wherein a batch may include multiple content management service operations. A further embodiment may include a response receiving unit that may be configured to receive a batch service response, wherein a batch service response indicates at least one of a state of a batch and a result from executing a batch. In one embodiment, a request sending unit may send one of the following batch service requests: creating and executing a new batch; getting all created batches; getting supported batch features; getting a batch; changing a state of a batch; and removing a batch.

In another embodiment, getting supported batch features may include getting one or more of the following features: transactional, non-transactional or both; synchronous, asynchronous, or both; sequential, non-sequential or both; failing-on-error, continuing-on-error, or both; removing-on-complete, retaining-on-complete or both; allowing to halt an asynchronous batch or not; and what resources may be allowed for batching or what resources may not be allowed for batching.

In a further embodiment, a state of the batch may include one of the following: initial state, running state, halted state and finished state. In a further embodiment, a request sending unit may be configured to send a batch service request indicating an operating mode of a batch. In a further embodiment, an operating mode may include one or more of the following: transactional mode or non-transactional mode; synchronous mode or asynchronous mode; sequential mode or non-sequential mode; failing-on-error mode or continuing-on-error mode; removing-on-complete mode or retaining-on-complete mode. In a still further embodiment, a batch service request may include a request for each content management service operation. In a further embodiment, a request may include an attachment element. In a further embodiment, an attachment element may cause content related to each content management service operation to be separately uploaded or downloaded. In a further embodiment, content related to each content management service operation may be of a text type or other media type.

In a further embodiment, a response receiving unit may receive one of the following batch service responses: a response to creating and executing a new batch; a response to getting all created batches; a response to getting supported batch features; a response to getting a batch; a response to changing a state of a batch; and a response to removing a batch.

One embodiment may include an apparatus for implementing multiple content management service operations. A further embodiment may include a request receiving unit that may be configured to receive a batch service request for a batch. In a further embodiment, a batch may include multiple content management service operations. A further embodiment may include a batch executing unit that may be configured to execute a batch in response to a batch service request. A further embodiment may include a response sending unit that may be configured to send a batch service response. In a further embodiment, a batch service response may indicate at least one of a state of a batch and a result from executing a batch.

In one embodiment, a batch executing unit may be configured to execute a batch based on an operating mode of the batch indicated by a batch service request. In a further embodiment, an operating mode may include one or more of the following: transactional mode or non-transactional mode; synchronous mode or asynchronous mode; sequential mode or non-sequential mode; failing-on-error mode or continuing-on-error mode; removing-on-complete mode or retaining-on-complete mode.

One embodiment may include computer program product for implementing multiple content management service operations, the computer program product being tangibly stored on a non-transient computer readable medium and containing computer executable instructions that, when being executed, enable the computer to perform the methods as disclosed above.

Embodiments of the present disclosure may aggregate multiple content management services operation into one batch and provide complete batch feature options to support different content management needs without having a built-in batch capability in the underlying system. Embodiments of the present disclosure may support binary upload and download of contents in a batch using a batch attachment, and may be widely applied in a RESTful service.

In some embodiments, a batch in a RESTful service may have the following characteristics:

Transactional VS. Non-Transactional

In some embodiments, a transaction allows a set of operations to be regarded as one unit. In some other embodiments, if some requests succeed while other requests fail, an underlying persistence system might be left in an inconsistent state. In some other embodiments, an inconsistent state may be complicated or impossible to correct. In some other embodiments, a transaction may also ensure that a set of operations executed by one process may not be interrupted by another process. In some other embodiments, a batch in a RESTful service may have a property indicating whether a batch instance may be transactional or non-transactional.

Synchronous VS. Asynchronous

In some embodiments, a synchronous API may require a client to wait for a response till operations are finished on the server side. In some other embodiments, when a batch request is sent to a server, the server may respond to a client only when all operations are finished. In some other embodiments, results of all operations may be returned to a client once for all. In some other embodiments, an asynchronous API may allow operations to be executed in a non-blocked manner In some other embodiments, when a batch request is sent to a server, the server may not wait for completion of all operations. In some other embodiments, instead, a server may immediately return a response to a client with a batch execution state and links. In some other embodiments, when latency is permitted, a client may check a batch execution state and may collect results in an individual request. In some other embodiments, a batch in a RESTful service may have a property indicating whether a batch instance can be synchronous or asynchronous.

Request Semantics within Batch Operations Must be Same as Individual Resources

In some embodiments, all individual resources may have their own semantics for an operation request and response, i.e., media type, request format, response format, etc. In some other embodiments, when resource operations are put into a batch, semantics of a plurality of operations in a batch may be no different with the ones on individual resource operations.

Accept or Reject Batch Based on System Capabilities

In some embodiments, a server may have capability restrictions. In an example embodiment, a server may only process a limited number of operations within a single batch, or may only process a batch request of a limited message size, or may retain an asynchronous state for a fixed period of time on the server side. In some other embodiments, there may also be a media type-based validity rule.

Descriptive Operation Name

In some embodiments, all operations in a batch may have descriptive operation names In some other embodiments, descriptive operation names may indicate real meanings of these operations, e.g., create a file, delete a folder, etc.

Fail-On-Error VS. Continue-On-Error

In some embodiments, a failure mechanism may define whether to continue executing an entire batch or terminate execution when one or more operations within a batch has failed.

Chattiness of the Batch Execution

In some embodiments, execution of a batch in a RESTful service may be completed via a plurality of HTTP requests. In some other embodiments, there might be concern on performance and latency of a batch execution. In some other embodiments, a manner of submission within one HTTP request may be provided. In some other embodiments, this manner may explicitly reduce chattiness in a batch execution.

Sequential VS. Non-Sequential

In some embodiments, sequential may require operations in a batch to be executed in an order of submission. In some other embodiments, sequence of operations may matter for some specific user scenarios. In some other embodiments, when batch operations are not performed sequentially, a server may freely determine whether to execute operations in sequence or in parallel.

Remove-On-Complete VS. Retain-On-Complete

In some embodiments, after all operations in a batch are completed, a server may opt to retain a batch instance (as well as its execution result) till a client explicitly deletes it, or opt to delete a batch instance immediately after complete results are retrieved once by a client.

In some embodiments, there may also exist some other considerations about a function and extensibility of a batch. In an example embodiment, these may include dependencies among multiple operations within a batch, and may have the following conditions: creating a resource, and then choosing how to proceed based on a response state; creating a resource, and then linking to it in another resource; and creating a resource, and then updating it later in a same batch, etc.

Now, refer to FIG. 1, in which a flow diagram of a method 100 for implementing multiple content management service operations according to the embodiments of the present disclosure is shown. The method 100 comprises steps S101-S102. In S101, a client sends a batch request service for a batch to a server, wherein the batch includes multiple content management service operations. Next, in S102, the client receives a batch service response from the server, wherein the batch service response indicates at least one of a state of the batch and a result from executing the batch In one embodiment, sending a batch service request for a batch may include sending one of a following batch service requests: creating and executing a new batch; getting all created batches; getting supported batch features; getting a batch; changing a state of a batch; and removing a batch. In order to describe the embodiments in detail, a concept of batch related resource is first introduced herein. In one embodiment, batch-related resources include: batch collection resource; batch capacity resource; and batch resource. In some embodiments, a batch collection resource is a top resource in RESTful services. In some other embodiments, it may be a collection container for all batches created in a repository or a tenant. In some other embodiments, it may allow users to create new batches in a collection and also allows users to retrieve batches collection.

In one embodiment, a batch collection resource is utilized to create and execute a new batch and get created batches. In an example embodiment, on an existing home document resource, repository resource or tenant resource, there might exist a new link relation http://identifiers.emc.com/linkrel/batches, which points to a batch resource. In a further embodiment, based on this link relation, a client may get all created batches using a GET approach in HTTP; or in order to create and execute a new batch, a client may POST a new batch to a batch collection.

In a further embodiment, a batch capacity resource describes batch features supported in a specific implementation. In a further embodiment, one or more of the following batch features supported by a system may be gotten through a batch capacity resource: transactional, non-transactional or both; synchronous, asynchronous, or both; sequential, non-sequential or both; failing-on-error, continuing-on-error, or both; removing-on-complete, retaining-on-complete or both; allowing to halt an asynchronous batch or not; and what resources may be allowed for batching or what resources may not allowed for batching. Explanations of various batch features may refer to the above description.

In a further embodiment, besides overall batch features, part of individual resources in a RESTful service may not allow to execute a batch. In a further embodiment, such information may also be discovered through batch capacity resources. In a further embodiment, there may exist a link relation for linking to a batch capacity resource: http://identifiers.emc.com/linkrel/batch-capabilities. In a further embodiment, a client may use a GET approach in HTTP to get supported batch features. In a further embodiment, exemplary code (1) represented by JSON and exemplary code (2) represented by XML for a batch capacity resource are provided below:

Exemplary code (1)

```
{
"transactions" : <trans, non-trans, or both>,
"synchronous" : <sync, async, or both>,
"sequence" : <seq, non-seq, or both>,
"on-error" : <fail, continue, or both>,
"on-complete" : <retain, cleanup, or both>,
"haltable" : <true, or false>,
"batchable-resources" : [document, folder, ...],
"non-batchable-resources" : [content, relation, ...],
"links" : [
{ "rel" : "self", "href" : <self URI> },
{ "rel" : "http://identifiers.emc.com/linkrel/batches", "href" : <batches URI> }
]
}
```

Exemplary code (2)

```
<batch-capabilities>
  <transactions>trans, non-trans, or both</transactions>
  <synchronous>sync, async, or both</synchronous>
  <sequence>seq, non-seq, or both</sequence>
  <on-error>fail, continue, or both</on-error>
  <on-complete>retain, cleanup, or both</on-complete>
  <haltable>true or false</haltable>
  <batchable-resources>
    <batchable-resource>document<batchable-resource>
    <batchable-resource>folder<batchable-resource>
    ...
  </batchable-resources>
  <non-batchable-resources>
    <non-batchable-resource>content</non-batchable-resource>
    <non-batchable-resource>relation</non-batchable-resource>
    ...
  </non-batchable-resources>
  <links>
    <link rel="self" href="self URI"/>
    <link rel="http://identifiers.emc.com/linkrel/batches" href="batches URI"/>
  </links>
</batch-capabilities>
```

In one embodiment, besides, an operating mode for a batch may be indicated in a batch service request sent from a client to a server. In a further embodiment, an operating mode that is settable for the batch may include one or more of the following: transactional mode or non-transactional mode; synchronous mode or asynchronous mode; sequential mode or non-sequential mode; failing-on-error mode or continuing-on-error mode; removing-on-complete mode or retaining-on-complete mode. In a further embodiment, if a client indicates some batch features that a RESTful service does not support, a server may return a status code 400 (namely, client request error).

In a further embodiment, a batch resource may be a single instance of batch created by a specific user in a repository or a tenant. In a further embodiment, a batch resource may include one or more of the following properties: a property describing a general purpose of the batch; a property indicating whether a batch should be executed in transactional mode or non-transactional mode; a property indicating whether a batch should be executed in synchronous mode or asynchronous mode; a property indicating whether a batch should be executed in sequential mode or non-sequential mode; a property indicating whether a batch should be executed in failing-on-error mode or continuing-on-error mode; a property indicating whether a batch should be executed in removing-on-complete mode or retaining-on-complete mode; a property describing a state of a batch; a property describing an owner of a batch; a property describing a created time of a batch; a property describing a finished time of a batch; and a property describing a total number of operations included in a batch.

In one embodiment, each batch resource may have its own state. In a further embodiment, a running batch may be halted or deleted based on its characteristics and capability. In a further embodiment, a batch resource may be utilized to get a batch, change a state of a batch, and remove a batch. In a further embodiment, a state of a batch may include one of the following: initial state, running state, halted state and finished state.

Initial State

In one embodiment, after a client creates a batch on a server side, the batch may be immediately in an initial state. In a further embodiment, this state may be seen only for an asynchronous batch. In a further embodiment, for a synchronous batch, a client may wait for a response till all operations may be completed.

Running State

In one embodiment, after a server starts executing a batch, the batch may be in running state. In a further embodiment, when a server has a capacity of executing a batch, a server may automatically transfer a batch state from an initial state to a running state without interaction of the client. In a further embodiment, for a synchronous batch, a client may wait for a response till all operations are finished/completed.

Halted State

In one embodiment, after a client explicitly halts a batch, the batch may be in halted state. In a further embodiment, only an asynchronous batch may be halted. In a further embodiment, this differs from removing a batch in that a removal operation may completely delete a batch and its state on a server side. In a further embodiment, in order to remove a halted batch (or a batch in any other states), a client may have to explicitly send a Delete request.

Finished State

In one embodiment, this may be a neutral state indicating that a batch instance may be finished. In a further embodiment, for a transactional batch, a result may be either completely success or completely failure. In a further embodiment, for a non-transactional batch, a response may include some successful operation results and some other unsuccessful operation results.

In one embodiment, each batch instance may have a plurality of operations (i.e., multiple content service operations), each (i.e., each content service operation) with an individual resource invocation. In a further embodiment, each operation may include a request, a response, and an operation state for an individual resource invocation. In a further embodiment, multiple operations may be associated with a specific batch instance. In a further embodiment, each operation may include the following information: a property indicating a unique identifier of an operation; a property describing a general purpose of an operation; a property indicating whether a response to an operation needs to include an original request message of an operation; an element describing a request for an individual resource; a property describing a state of an operation; an element describing a response for individual resource; a property describing execution start time of an operation; and a property describing execution end time of an operation. In a further embodiment, a state of each operation may be: a waiting state that may indicate that an operation has not been executed yet; a running state that may indicate an operation is being executed but has not completed yet; and a finished state that may indicate that an operation is finished and whether a result is succeeded or failed. In a further embodiment, for a waiting or running operation, it may not be required to return a response within an operation.

In one embodiment, exemplary code (3) below represented by JSON and exemplary code (4) below represented by XML of a batch resource will be provided below:

Exemplary code (3)

```
{
"description" : <description for the batch>,
"synchronous" : <true, or false>,
"transactional" : <true, or false>,
"sequential" : <true, or false>,
"on-error" : <fail, or continue>,
"on-complete" : <retain, or remove>,
"state" : <initial, running, halted, or finished>,
"owner" : <owner name>,
"created" : <created time>,
"finished" : <finished time>,
"operations" : [
{
"id" : "unique operation id",
"description" : "description of the batch operation",
"return-request" : "true, false",
"state" : "waiting, running or finished",
"started" : <started time>,
"finished" : <finished time>,
"request" : {
"method" : "GET, POST, PUT, DELETE, ..",
"uri" : "URI of the individual resource",
"headers" : [
{"name 1" : "value 1"},
{"name 2" : "value 2"}
],
"entity" : {...},
"attachment" : {
"Include" : {
"href" : "cid:the content id"
}
}
},
"response" : {
"status" : "200, 201, ....",
"headers" : [
{"name 1" : "value 1"},
{"name 2" : "value 2"}
],
"entity" : {...}
}
},
{...},
...
]
"links" : [
{ "rel" : "self", "href" : <self URI> },
{ "rel" : "http://identifiers.emc.com/linkrel/owner",
"href" : <owner URI> }
]
}
```

Exemplary code (4)

```
<batch>
<description>description for the batch</description>
<synchronous>true or false</synchronous>
<transactional>true or false</transactional>
<sequential>true or false</sequential>
<on-error>fail or continue</on-error>
<on-complete>retain or remove</on-complete>
<state>initial, running, halted or finished</state>
```

Exemplary code (4)

```
<owner>owner name</owner>
<created>created time</created>
<finished>finished time</finished>
<operations>
<operation id="UID">
<description>description of the batch operation</description>
<return-request>true, false</return-request>
<state>waiting, running, finished</state>
<started>started time</started>
<finished>finished time</finished>
<!--
allowable http methods are get, post, patch, put and delete;
here we use 'put' as an example;
get and delete methods do not have an entity;
only one method is allowed for a request -->
<request method="GET, POST, PUT, DELETE, .." uri="URI of the
individual resource">
<!-- multiple http headers could be specified for a request -->
<header name="name 1" value="value 1"/>
<header name="name 2" value="value 2"/>
<!-- only one entity is allowed for a request -->
<entity>
<!-- re-use existing representation of the individual resource request -->
</entity>
<attachment>
<xop:Includexmlns:xop='http://www.w3.org/2004/08/xop/include'
href='cid:
content-id'/>
</attachment>
</request>
<!-- a response is set by the server -->
```

Exemplary code (4)

```
<response status="200, 201, ...">
<!-- multiple http headers could be returned for a response -->
<header name="name 1" value="value 1"/>
<header name="name 2" value="value 2"/>
<entity>
<!-- re-use existing representation of the individual resource response -->
</entity>
</entity>
</response>
</operation>
...
<operations>
<links>
<link rel="self" href="self URI"/>
<link rel="http://identifiers.emc.com/linkrel/owner" href="owner URI"/>
</links>
</batch>
```

In one embodiment, in all the exemplary codes provided above, it may be seen that all operation requests may be embedded into a batch resource by an XML or JSON format. In a further embodiment, if an operation has a relevant binary content, e.g., a user desires to create an object and content simultaneously, the above batch data models may be incapable of processing such a situation. In a further embodiment, an XML exemplary code (5) with a content-type header in a request for each operation based on the above batch data model is provided below:

Exemplary code (5)

```
<?xml version="1.0" encoding="UTF-8"?>
<batch>
<return-request>true</return-request>
<operations>
<operation id="id-100">
<description>create object with content</description>
<request
method="POST"uri="http://host:port/dctm-rest/repositories/REPO/folders/0c
00208080000107/objects">
<header   name="Content-Type"   value="multipart/form-data;
boundary=frontier"/>
<header name="Accept" value="application/vnd.emc.documentum+xml"/>
<entity>


--frontier
Content-Disposition: form-data; name="metadata"
Content-Type: application/vnd.emc.documentum+xml

<object><properties><object_name>my-test-doc</object_name>
</properties></object>

--frontier
Content-Disposition: form-data; name="binary"
Content-Type: text/plain

this is binary content

--frontier--
</entity>
</request>
</operation>
</operations>
</batch>
```

In a further embodiment, it may be contemplated from the above example that sending content together with a batch may have many restrictions: to embed content in a batch representation, a text type must be used; it cannot support streaming, which means only very small piece of text can be embedded into a batch representation; many operations might exist in one batch, then there may be memory issue if all operations have embedded content.

In one embodiment, therefore, a request for each operation (i.e., each content service operation) may have an attachment element. In a further embodiment, an attachment element may enable content related to each operation to be separately uploaded or downloaded. In an additional or alternate embodiment, content related to each operation may be of a text type or other media type. In a further embodiment, streaming may be supported, and a client may create many large files in one batch without being concerned about a memory size. In a further embodiment, exemplary code (6) utilizing an existing XML binary optimized packaging protocol (XOP) is provided below. Those skilled in the art may get a JSON representation based on XOP extension.

Exemplary code (6)

```
POST http://localhost:8080/dctm-rest/repositories/acme/batches
Content-Type:
Multipart/Related;boundary=frontier;type="application/xop+xml";start="batc
h";start-info="application/vnd.emc.documentum+xml"
Accept: application/vnd.emc.documentum+xml
--frontier
Content-Type:                                    application/xop+xml;
type="application/vnd.emc.documentum+xml"
Content-ID: batch
Content-disposition: form-data; name=batch
<?xml version="1.0" encoding="UTF-8"?>
<batch>
<transactional>false</transactional>
<sequential>false</sequential>
<return-request>true</return-request>
<operations>
<operation id="id-100">
<description>create object with content</description>
<request
method="POST" uri="/repositories/REPO/folders/0c00208080000107/object
s">
<header
name="Content-Type" value="application/vnd.emc.documentum+xml"/>
<header name="Accept" value="application/vnd.emc.documentum+xml"/>
<entity>
<object><properties><object_name>my-test-doc</object_name>
</properties></object>
</entity>
<attachment><xop:Includexmlns:xop='http://www.w3.org/2004/08/xop/inclu
de' href='cid:id-100-content'/></attachment>
</request>
</operation>
<operation id="id-101">
<description>create object with content</description>
<request
method="POST" uri="/repositories/REPO/folders/0c00208080000107/object
s">
<header
name="Content-Type" value="application/vnd.emc.documentum+xml"/>
<header name="Accept" value="application/vnd.emc.documentum+xml"/>
<entity>
<object><properties><object_name>my-test2-doc</object_name>
</properties></object>
</entity>
<attachment><xop:Includexmlns:xop='http://www.w3.org/2004/08/xop/inclu
de' href='cid:id-101-content'/></attachment>
</request>
</operation>
</operations>
</batch>
--frontier
Content-Type: text/plain
Content-ID: id-100-content
Content-disposition: form-data; name=id-100-content
i'm the content of id-100
--frontier
Content-Type: text/plain
Content-ID: id-101-content
Content-disposition: form-data; name=id-101-content
i'm the content of id-101
--frontier—
```

In one embodiment, a unique authorization header may be set for multiple operations. In a further embodiment, a unique certification header may indicate that multiple operations may be owned and executed by a single user. In an additional or alternate embodiment, respective authorization headers may be set for individual operations in multiple operations. In a further embodiment, respective certification headers may indicate that individual operations may be owned and executed by respective users.

In one embodiment, respective media types may be set for individual operations in multiple operations. In a further embodiment, respective media types can be identical or different.

Next, with reference to step S102, the client receives a batch service response from the server, wherein the batch service response indicates at least one of a state of the batch and a result from executing the batch. In one embodiment, a batch service response may indicate a state of a batch. In a further embodiment a state of a batch may include one of the following: an initial state, a running state, a halted state and a finished state. In a further embodiment, besides, a batch response may indicate information such as owner of a batch, a create time, a finish time, total number of operations included therein, etc. In a further embodiment, besides, batch service responses may further include an indication of a state of each operation in multiple operations included in a batch, a response of each operation for requesting for individual resources, an execution start time of each operation, and an execute end time of each operation, amongst other information. In a further embodiment, a batch service response may also indicate a state of each operation in multiple operations included in a batch and/or a result from executing a batch.

In one embodiment, in a response to each operation in a batch, a header related to web cache may be set, e.g., etag, last-modified-date, etc., which indicates that a client may utilize a HTTP cache mechanism to enhance performance. In an example embodiment, for an asynchronous batch, a client may get a batch multiple times to get asynchronous results. In a further embodiment, if these operations have been completed, it may be unnecessary to repetitively send to a client a response of an individual operation. In a further embodiment, a web cache mechanism may play a significant role.

In one embodiment, a batch service response may also indicate an operation that may be performed on a batch-related resource. In a further embodiment, an operation may indicate by a link relation included in a batch service response. In a further embodiment, a link relation may be for indicating a client, which operations may be performed to a batch based on a state of a batch. In a further embodiment, a REST client may follow a link relation to change a state of a batch. In an example embodiment, when a batch is in an initial state or an operating state, a link relation http://identifiers.emc.com/linkrel/halt may arise on an asynchronous batch resource, and a client may follow a link relation to halt an asynchronous batch. In a further embodiment, when a batch is in any of the states, a link relation http://identifiers.emc.com/linkrel/delete may arise on a batch resource, and a client may follow a link relation to remove a batch. In a further embodiment, besides, a link relation may include a link relation for linking to a batch collection resource, a batch capacity resource, and a batch resource per se. In an example embodiment, a client may get a specific batch, change a state of a specific batch, or remove a specific batch based on a link relation for linking to a batch per se. In a further embodiment, it should be understood that the above disclosed link relations are only exemplary in nature, and not intended to exhaust all possible link relations.

In one embodiment, based on various resources related to a batch described above (including batch collection resource, batch capacity resource, and batch resource, which may also be collectively referred to as batch data model), exemplary code (7) of a request for and a response to creating a batch, exemplary code (8) of a request for and a response to getting an asynchronous batch, exemplary code (9) of a request for and a response to halting an asynchronous batch, and exemplary code (10) of a request for and a response to removing an asynchronous batch.

---

Example code (7)

```
Request for creating a batch
POST <base URI>/batches HTTP/1.1
Authorization: <encoded user credential>
Content-Type: application/vnd.emc.documentum+xml
Accept: application/vnd.emc.documentum+xml
<batch>
<description>batch for indexing</description>
<synchronous>true</synchronous>
<transactional>false</transactional>
<sequential>false</sequential>
<on-error>continue</on-error>
<on-complete>retain</on-complete>
<operations>
<operation id="xfac1de2">
<description>create a document operation</description>
<return-request>true</return-request>
<request method="PUT" uri="<base URI>/objects">
<header
name="Content-Type" value="application/vnd.emc.documentum+xml"/>
<header name="Accept"
value="application/vnd.emc.documentum+xml"/>
<entity>
<document>
<properties>
<object_name>readme</object_name>
<title>Readme for indexing</title>
</properties>
</document>
</entity>
</request>
</operation>
...
<operations>
</batch>
Response to creating a batch
HTTP/1.1 201 Created
Location: <base URI>/batches/b5912d71
Content-Type: application/xml
<batch>
<description>batch for indexing</description>
<synchronous>true</synchronous>
<transactional>false</transactional>
<sequential>false</sequential>
<on-error>continue</on-error>
<on-complete>retain</on-complete>
<state>finished</state>
<owner>dav</owner>
<created>2014-10-15T15:27:30.000+08:00</created>
<finished>2014-10-15T15:32:15.000+08:00</finished>
<operations>
coperation id="xfac1de2">
<description>create a document operation</description>
<return-request>true</return-request>
<state>finished</state>
<started>2014-10-15T15:28:10.000+08:00</started>
<finished>2014-10-15T15:31:10.000+08:00</finished>
<!-- the request is included in the response since 'return-request' is set to TRUE -->
<request method="PUT" uri="<base URI>/objects">
<header
name="Content-Type" value="application/vnd.emc.documentum+xml"/>
<header name="Accept"
value="application/vnd.emc.documentum+xml"/>
```

Example code (7)

```
<entity>
<document>
<properties>
<object_name>readme</object_name>
<title>Readme for indexing</title>
</properties>
</document>
</entity>
</request>
<response status="201">
<header name="Location" value="<base URI>/objects/090020808a5e1"/>
<header name="Content-Type" value="application/vnd.emc.documentum+xml"/>
<entity>
<document>
<properties>
<object_name>readme</object_name>
<title>Readme for indexing</title>
</properties>
<links>
<linkrel="self"href="<base URI>/objects/090020808a5e1"/>
</links>
</document>
</entity>
</response>
</operation>
...
</operations>
<links>
<link rel="self" href="<base URI>/batches/b5912d71"/>
<link rel="http://identifiers.emc.com/linkrel/owner" href="/users/dave"/>
</links>
</batch>
```

Exemplary code (8)

```
Request for getting an asynchronous batch request
GET <base URI>/batches/b5912d81/operations HTTP/1.1
Authorization: <encoded user credential>
Accept: application/atom+xml
Response to getting an asynchronous batch
HTTP/1.1 200 OK
Location: <base URI>/batches/b5912d71
Content-Type: application/vnd.emc.documentum+xml
<batch>
<description>batch for indexing</description>
<synchronous>true</synchronous>
<transactional>false</transactional>
<sequential>false</sequential>
<on-error>continue</on-error>
<on-complete>retain</on-complete>
<state>running</state>
<owner>dav</owner>
<created>2014-10-15T15:27:30.000+08:00</created>
<operations>
<operation id="xfac1de2">
<description>create a document operation</description>
<return-request>false</return-request>
<state>completed</state>
<started>2014-10-15T15:28:10.000+08:00</started>
<finished>2014-10-15T15:31:10.000+08:00</finished>
<response>
<status code="201">
<header name="Location" value="<base URI>/objects/090020808a5e1"/>
<header name="Content-Type" value="application/vnd.emc.documentum+xml"/>
<entity>
<document>
<properties>
<object_name>readme</object_name>
<title>Readme for indexing</title>
</properties>
<links>
<linkrel="self"href="<base URI>/objects/090020808a5e1"/>
</links>
</document>
</entity>
</response>
</operation>
<operation id="fa1cxdc3">
<description>delete a folder operation</description>
<return-request>true</return-request>
<state>waiting</state>
<started>2014-10-15T15:28:10.000+08:00</started>
<request method="DELETE"
uri="<base URI>/objects/0b0000897c2adf"/>
</operation>
...
</operations>
<links>
<link rel="self" href="<base URI>/batches/b5912d71"/>
```

| Exemplary code (8) |
|---|

```
<link rel="http://identifiers.emc.com/linkrel/owner" href="/users/dave"/>
<link rel="http://identifiers.emc.com/linkrel/del-batch" href="<base URI>/batches/b5912d71"/>
</links>
</batch>
```

| Exemplary code (9) |
|---|

```
Request for suspending an asynchronous batch
PUT <base URI>/batches/b5912d71 HTTP/1.1
Authorization: <encoded user credential>
Accept: application/vnd.emc.documentum+xml
Response to suspending an asynchronous batch
HTTP/1.1 200 OK
Location: <base URI>/batches/b5912d71
Content-Type: application/vnd.emc.documentum+xml
<batch>
<description>batch for indexing</description>
<synchronous>true</synchronous>
<transactional>false</transactional>
<sequential>false</sequential>
<on-error>continue</on-error>
<on-complete>retain</on-complete>
<state>halted</state>
<owner>dav</owner>
<created>2014-10-15T15:27:30.000+08:00</created>
<finished>2014-10-15T15:32:15.000+08:00</finished>
<operations>
<operation id="xfac1de2">
<description>create a document operation</description>
<return-request>true</return-request>
<state>finished</state>
<started>2014-10-15T15:28:10.000+08:00</started>
<finished>2014-10-15T15:31:10.000+08:00</finished>
<request method="PUT" uri="<base URI>/objects">
<header name="Content-Type" value="application/vnd.emc.documentum+xml"/>
<header name="Accept" value="application/vnd.emc.documentum+xml"/>
<entity>
<document>
<properties>
<object_name>readme</object_name>
<title>Readme for indexing</title>
</properties>
</document>
</document>
</entity>
</request>
<response>
<status code="201">
<header name="Location" value="<base URI>/objects/090020808a5e1"/>
<header name="Content-Type" value="application/vnd.emc.documentum+xml"/>
<entity>
<document>
<properties>
<object_name>readme</object_name>
<title>Readme for indexing</title>
</properties>
<links>
<linkrel="self"href="<base URI>/objects/090020808a5e1"/>
</links>
</document>
</entity>
</response>
</operation>
...
</operations>
<links>
<link rel="self" href="<base URI>/batches/b5912d71"/>
<link rel="http://identifiers.emc.com/linkrel/owner" href="/users/dave"/>
```

-continued

Exemplary code (9)

```
<link    rel="http://identifiers.emc.com/linkrel/del-batch"    href="<base
URI>/batches/b5912d71"/>
</links>
</batch>
```

Exemplary code (10)

```
Request for removing the asynchronous batch
DELETE <base URI>/batches/b5912d77 HTTP/1.1
Authorization: <encoded user credential>
Response to removing an asynchronous batch
HTTP/1.1 204 No Content
```

Figure 2:
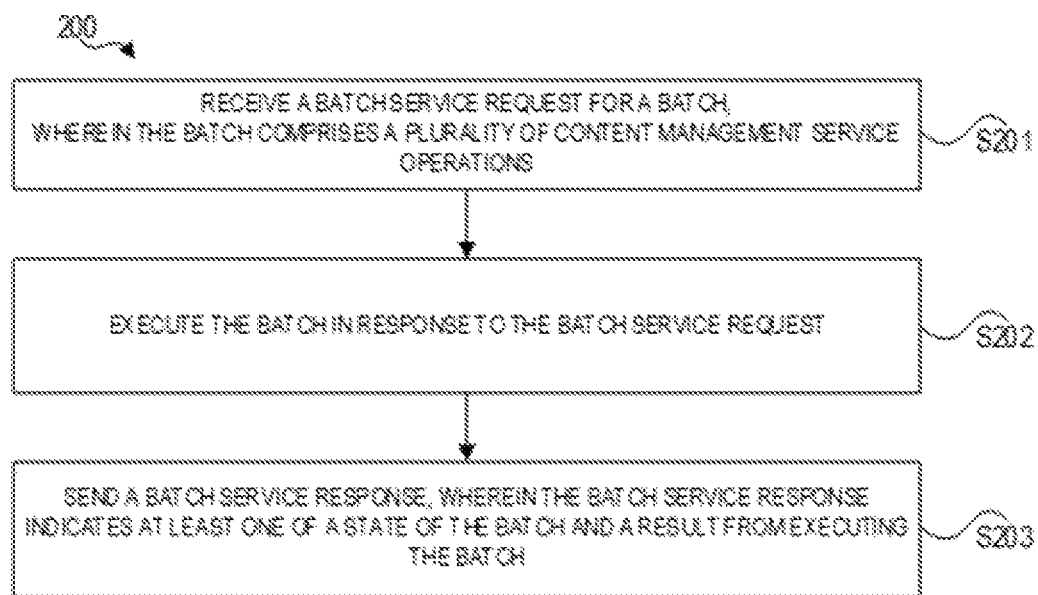
FIG. 2 shows an exemplary flow diagram of a method 200 for implementing multiple content management service operations according to embodiments of the present disclosure.

Reference is now made to FIG. 2, in which a flow diagram of a method 200 for implementing multiple content management service operations according to the embodiments of the present disclosure is shown. Method 200 comprises steps S201 to S202.

In S201, the server receives a batch service request for a batch from a client, wherein the batch comprises multiple content management service operations. In S202, the server executes the batch in response to the batch service request. In S203, the server sends a batch service request to the client, wherein the batch service response indicates at least one of a state of the batch and a result from executing the batch.

In one embodiment, a batch request received by a server from a client may include one of the following batch service requests: creating and executing a new batch; getting all created batches; getting supported batch features; getting a batch; changing a state of a batch; and removing a batch. In a further embodiment, these batch service requests may be understood with reference to the aforementioned and exemplary codes (1) to (10), which will not be detailed here again.

In a further embodiment, a batch request received in step S201 indicates an operating mode of a batch, wherein an operating mode comprises one or more of the following: a transactional mode or a non-transactional mode; a synchronous mode or an asynchronous mode; a sequential mode or a non-sequential mode; a failing-on-error mode or a continuing-on-error mode; a removing-on-complete mode or a retaining-on-complete mode.

In one embodiment, a server may execute a batch based on a batch operating mode as indicated. In an example embodiment, when it is indicated that a batch operates in transactional mode, a server may regard a set of operations included in a batch as a single unit and may ensure that a set of operations executed by one process may not be interrupted by another process. In another example embodiment, when it is indicated that a batch operates in synchronous mode, a server may only respond to a client when all operations are completed, and results of all operations may be returned to a client once for all. In a further embodiment when it is indicated that a batch operates in an asynchronous mode, a server may immediately return to a client a response with a batch execution state and links. In an example embodiment, when it is indicated that a batch operates in non-sequential mode, a server may freely determine to execute multiple operations included in a batch in sequence or in parallel. In another example embodiment, when it is indicated that a batch operates in retaining-on-complete mode, a server may opt to retain a batch instance (and its execution results) till a client explicitly deletes it. In a further embodiment, when it is indicated that a batch operates in a removing-on-complete mode, a server may opt to remove a batch instance immediately after complete results are once retrieved by a client.

In a further embodiment, a server may also be responsible for part of batch state transfer. In an example embodiment, after a new batch is created in response to a request for creating a batch, a batch may be immediately in an initial state. In an example embodiment, when a server has a capacity of executing a batch, a server may have to automatically transfer a batch state from initial state to running state without interaction with a client.

As mentioned above, in one embodiment, a server sends a batch service response indicating a state of a batch to a client, wherein a state of a batch may include one of the following: an initial state, a running state, a halted state and a finished state. In a further embodiment, a batch response may indicate information such as owner of a batch, a create time, a finish time, total number of operations included therein, etc. In a further embodiment, a batch service responses may further include an indication of a state of each operation in multiple operations included in a batch, a response of each operation for requesting for individual resources, execution start time of each operation, and execute end time of each operation, among other information. In a further embodiment, a batch service response also indicates a state of each operation in multiple operations included in a batch and/or a result from executing a batch.

In a further embodiment, a batch service response may also indicate an operation that may be performed on a batch-related resource. In a further embodiment, an operation may be indicated by a link relation included in a batch service response. In a further embodiment, a link relation may be for indicating a client which operations may be performed to a batch based on a state of a batch. In a further embodiment a REST client follows a link relation to change a state of a batch.

In one embodiment, a batch service response sent from a server to a client may include one of the following batch service responses: a response to creating and executing a new batch; a response to getting all created batches; a response to getting supported batch features; a response to getting a batch; a response to changing a state of a batch; and a response to removing a batch.

In a further embodiment, based on the above described batch data model (including various resources related to a batch), with reference to exemplary code (7) of a request for and a response to creating a batch, exemplary code (8) of a request for and a response to getting an asynchronous batch, exemplary code (9) of a request for and a response to halting the asynchronous batch, and exemplary code (10) of a request for and a response to removing a batch, rules and forms of various responses sent by a server may be clearly understood.

Figure 3:
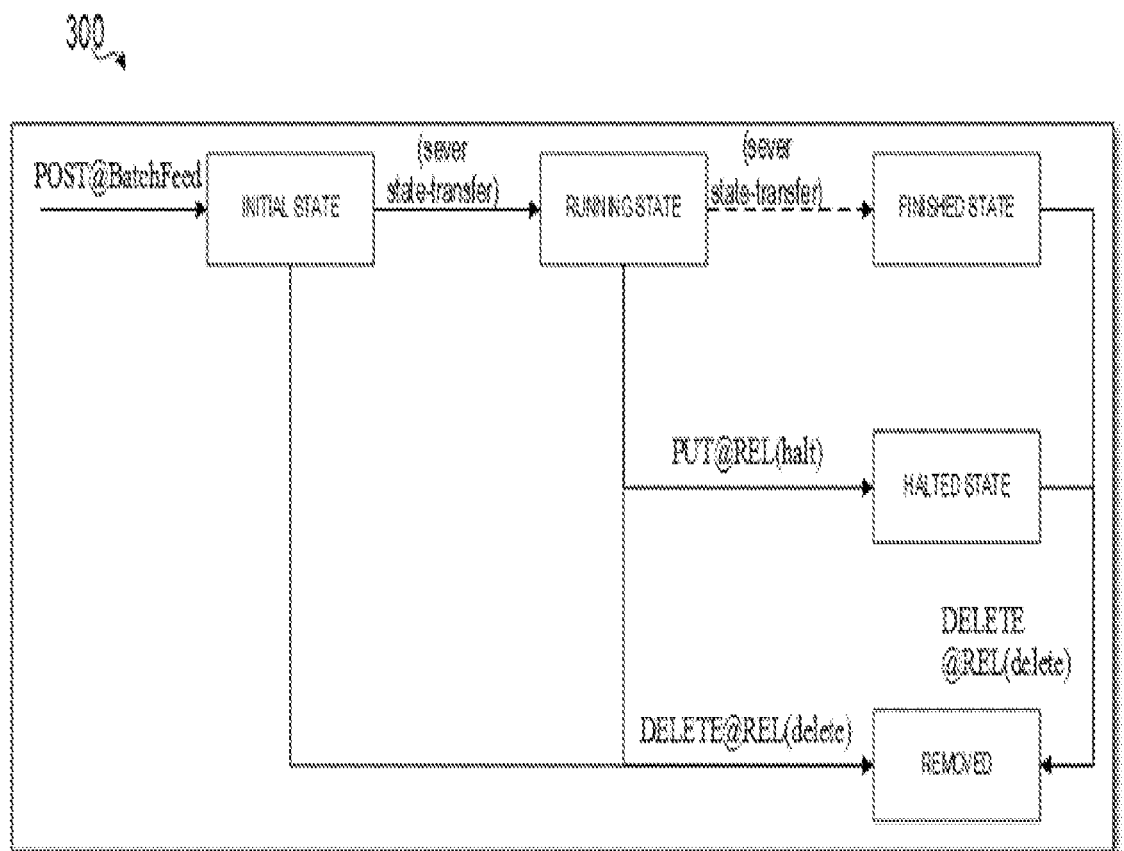
FIG. 3 shows an exemplary diagram of state transfer 300 for a batch according to embodiments of the present disclosure.

Now, refer to FIG. 3, in which a diagram of state transfer 300 for a batch according to the embodiments of the present disclosure is shown. As mentioned above, a state of a batch include an initial state, a running state, a halted state, and a completed/finished state (because "removed" indicates that a batch instance may have been removed by the server, it may be understood in this case that the batch does not exist; therefore, "removed" is not one of batch states). After a client create a batch on the server side (i.e., POST@BatchFeed in the figure), the batch is immediately in initial state. The REST client follows a link relation to change a state of the batch. For example, when a batch is in initial state or running state, a link relation http://identifiers.emc.com/linkrel/halt will arise in an asynchronous batch resource, and the client follows the link relation to halt an asynchronous batch (i.e., PUT@REL(halt) in the figure). When the batch is in any of the states, a link relation http://identifiers.emc.com/linkrel/delete may arise on a batch resource, and the client follows the link relation to remove a batch (i.e., DELETE@REL(delete) in the figure).

Figure 4:
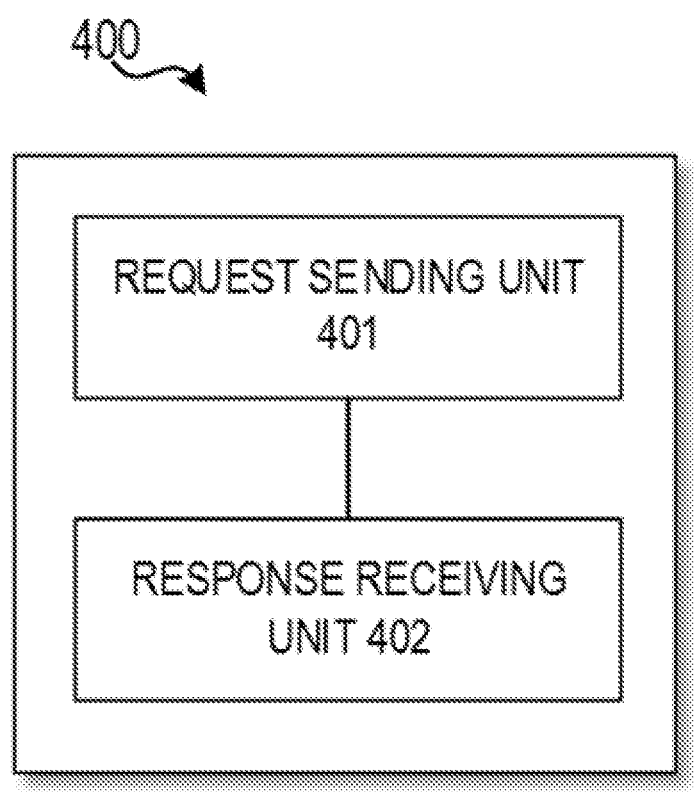
FIG. 4 shows a block diagram of an exemplary apparatus 400 for implementing multiple content management service operations according to embodiments of the present disclosure.

Now, refer to FIG. 4, a block diagram of an apparatus 400 for implementing multiple content management service operations according to the embodiments of the present disclosure is shown. Apparatus 400 includes request sending unit 401 configured to configured to send a batch service request for a batch, wherein the batch comprises multiple content management service operations. Apparatus 400 further includes response receiving unit 402 configured to receive a batch service response, wherein the batch service response indicates at least one of a state of the batch and a result from executing the batch.

In one embodiment, request sending unit 401 may be configured to send one of the following batch service requests: creating and executing a new batch; getting all created batches; getting supported batch features; getting a batch; changing a state of a batch; and removing a batch. In a further embodiment, getting supported batch features may include getting one or more of the following features: transactional, non-transactional or both; synchronous, asynchronous, or both; sequential, non-sequential or both; failing-on-error, continuing-on-error, or both; removing-on-complete, retaining-on-complete or both; allowing to halt an asynchronous batch or not; and what resources are allowed for batching or what resources are not allowed for batching. In a further embodiment, a state of a batch may include one of the following: an initial state, a running state, a halted state and a completed/finished state.

In one embodiment, request sending unit 401 may be configured to send a batch service request indicating an operating mode of the batch. In a further embodiment an operating mode may include one or more of the following: transactional mode or non-transactional mode; synchronous mode or asynchronous mode; sequential mode or non-sequential mode; failing-on-error mode or continuing-on-error mode; removing-on-complete mode or retaining-on-complete mode. In one embodiment, a batch service request may include a request for each content management service operation. In a further embodiment, a request may include an attachment element. In a further embodiment an attachment element may cause content related to each content management service operation to be separately uploaded or downloaded. In a further embodiment, content related to each content management service operation may be of a text type or other media type.

In one embodiment, response receiving unit 402 may receive one of the following batch service responses: a response to creating and executing a new batch; a response to getting all created batches; a response to getting supported batch features; a response to getting a batch; a response to changing a state of a batch; and a response to removing a batch.

Figure 5:
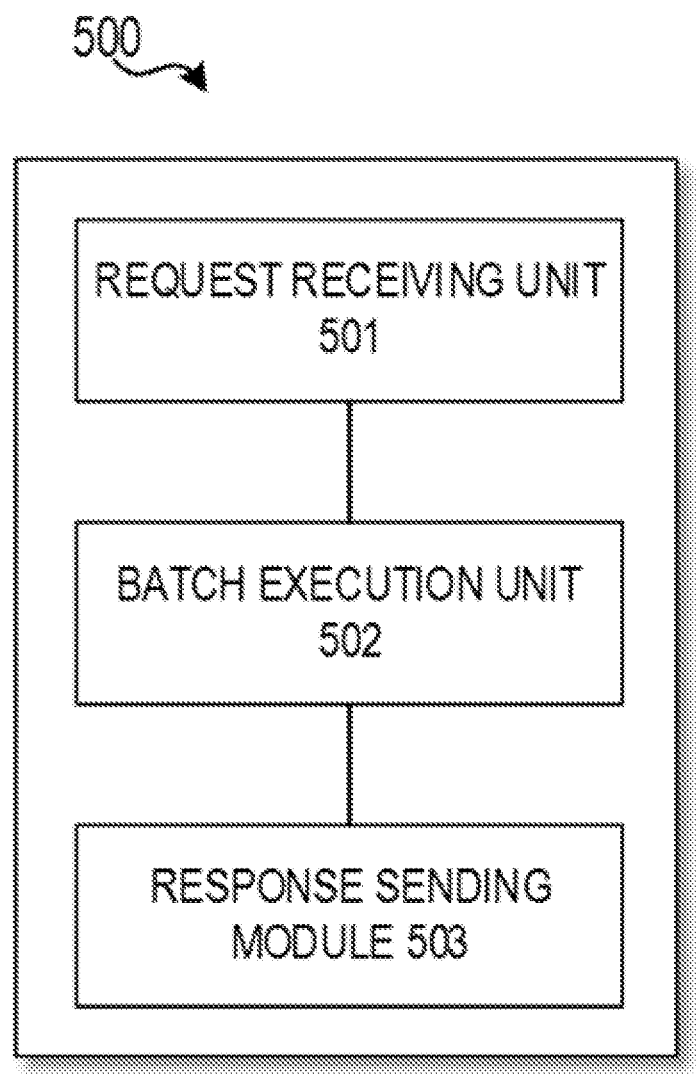
FIG. 5 shows a block diagram of an apparatus 500 for implementing multiple content management service operations according to the embodiments of the present disclosure.

Now, refer to FIG. 5, in which a block diagram of an apparatus 500 for implementing multiple content management service operations according to the embodiments of the present disclosure is shown. Apparatus 500 comprises: request receiving unit 501 configured to receive a batch service request for a batch, wherein the batch comprises multiple content management service operations; batch executing unit 502 configured to execute the batch in response to the batch service request; and response sending unit 503 configured to send a batch service response, wherein the batch service response indicates at least one of a state of the batch and a result from executing the batch.

In one embodiment, batch executing unit 502 may be configured to execute a batch based on an operating mode of the batch indicated by a batch service request. In a further embodiment, an operating mode may include one or more of the following: transactional mode or non-transactional mode; synchronous mode or asynchronous mode; sequential mode or non-sequential mode; failing-on-error mode or continuing-on-error mode; removing-on-complete mode or retaining-on-complete mode.

Figure 6:
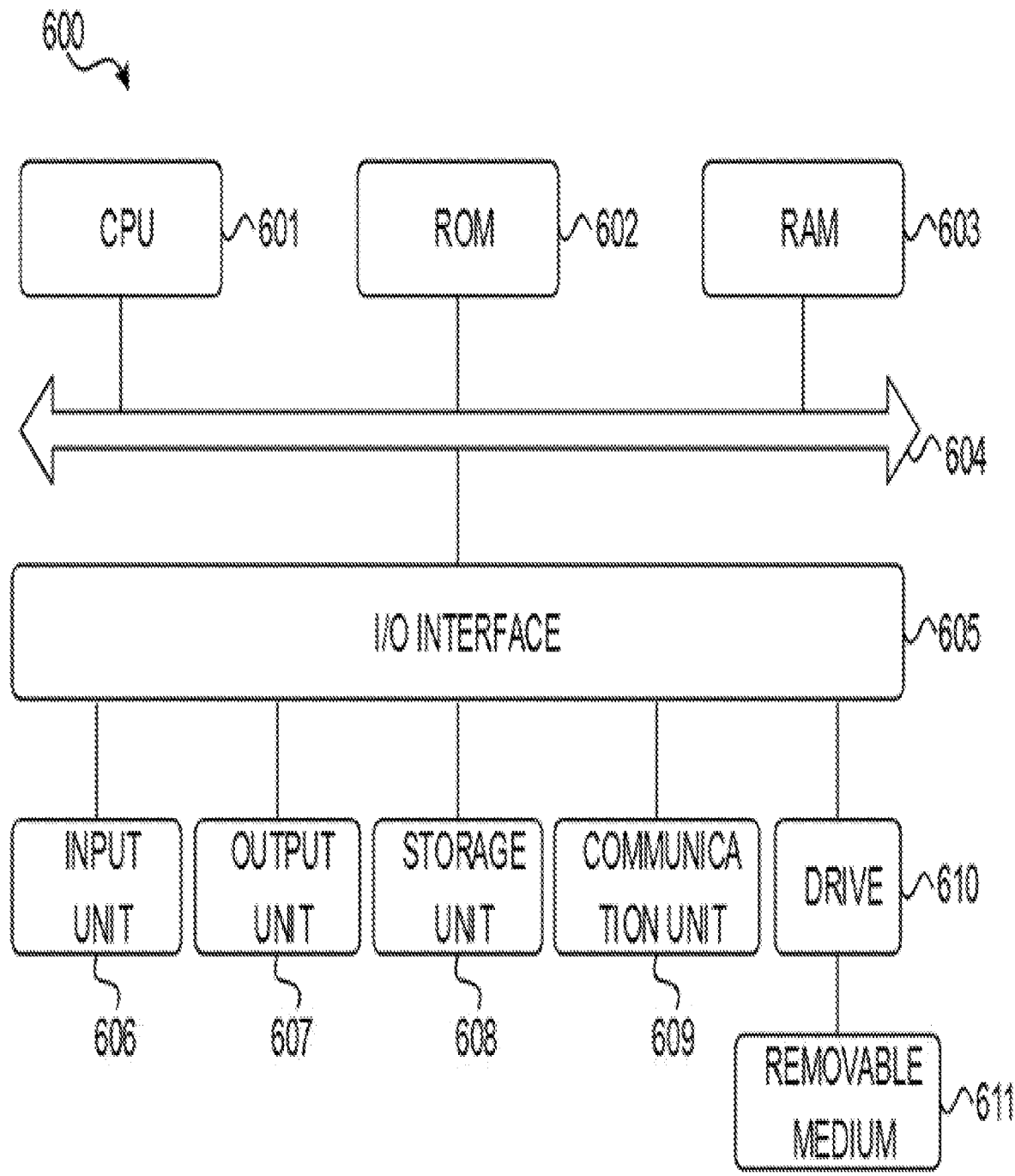
FIG. 6 shows a block diagram of a computer system 600 adapted to implement the exemplary embodiments of the present disclosure.

Now, refer to FIG. 6, in which a block diagram of a computer system 600 adapted to implement the exemplary embodiments of the present disclosure is shown. As shown in FIG. 6, computer system 600 comprises central processing unit (CPU) 601, which may perform any proper actions and processing based on a program stored in read-only memory (ROM) 602 or a program loaded from memory section 608 to random access memory (ROM) 603. RAM 603, there further store various programs and data needed for operations of apparatus 400 or apparatus 500. CPU 601, ROM 602, and RAM 603 are connected to each other via bus 604. Input/output (I/O) interface 605 is also connected to bus 604.

The following components are connected to I/O interface 605: an input part including a keyboard, a mouse and the like; output part 607 including a cathode ray tube (CRT), a liquid crystal display (LCD) and a loudspeaker, etc.; memory part 608 including a hard disk, etc.; communication part 609 including a network interface card such as LAN card, model, etc. Communication part 609 performs communication processing via a network such as Internet. Drive 610 may also be connected to I/O interface 605 as needed. Removable medium 611, such as a magnetic disk, an optic disk, a magneto-optical disk, a semiconductor memory, and the like, is mounted on drive 610 as required, such that a computer program read therefrom is mounted in storage part 608 as required.

In particular, according to the embodiments of the present disclosure, method 100 described with reference to FIG. 1 and method 200 described with reference to FIG. 2 may be implemented as computer software programs. For example, embodiments of the present disclosure include a computer program product that is tangibly stored on a non-transient computer-readable medium and comprises computer executable instructions that when being executed, causes the computer to perform any steps of method 100. For example, embodiments of the present disclosure include a computer program product that is tangibly stored on a non-transient computer-readable medium and comprises computer executable instructions, the computer executable instructions, when being executed, causes the computer to perform any steps of method 200.

In view of the above, according to the embodiments of the present disclosure, there is provided a method, a computer program product and apparatus for implementing multiple content management service operations. Embodiments of the present disclosure may aggregate multiple content management service operations into one batch and provide complete batch feature options to support different content management needs without having a built-in batch capability in the underlying system. Embodiments of the present disclosure may support binary upload and download of contents in a batch using a batch attachment; and therefore, may be widely applied in a RESTful service.

Generally, various exemplary embodiments of the present disclosure may be implemented in hardware or a specific circuit, software, logic, or any combination thereof. Some aspects may be implemented in hardware, while other aspects may be implemented in firmware or software executable by a controller, a microprocessor, or other computing device. When various aspects of the embodiments of the present disclosure are illustrated or described with block diagrams, flow diagrams or other graphical representations, it would be appreciated that blocks, apparatuses, systems, technologies or methods described here may be implemented as non-limitative examples in hardware, software, firmware, specific circuit or logic, general hardware or controller or other computing device, or some combinations thereof.

Moreover, respective blocks in the flow diagram may be regarded as method steps, and/or operations generated by computer program code, and/or understood as a plurality of multiple logical circuit elements for performing relevant functions. For example, embodiments of the present disclosure include a computer program product that includes a computer program tangibly embodied on a machine readable medium, the computer program including program code configured to implement the above described methods.

Within the context of the present disclosure, the machine readable medium may be any tangible medium including or storing programs for or related to the instruction execution system, apparatus, or device. The machine readable medium may include, but not limited to, electronic, magnetic, optical, electro-magnetic, infrared or semiconductor system, apparatus or device, or any combination thereof. Mode detailed examples of a machine-readable storage medium include an electric connection with one or more wires, a portable computer magnetic disk, hard disk, random access memory (RAM), read-only memory (ROM), erasable programmable read-only memory (EPROM or flash memory), optical storage device, magnetic storage device, or any appropriate combination thereof.

The computer program code for implementing methods of the disclosure may be compiled with one or more programming languages. These computer program code may be provided to a processor of a general computer, a dedicated computer or other programmable data processing device, such that the program code, when being executed by a computer or other programmable data processing device, causes functions/operations specified in the flow diagrams and/or blocks to be implemented. The program code may be executed completely on the computer, partially on the computer, as an independent software packet, partially on the computer while partially on a remote computer, or completely on the remote computer or server.

Additionally, although the operations are described in a specific order, it should not be understood that such operations are performed in the shown specific order or in a successive order, or all of the shown operations are performed to obtain a desired result. In some cases, multi-task or parallel processing would be beneficial. Likewise, although some specific implementation details are included in the above discussion, it should not be explained as limiting the scope of any invention or claims, but should be explained as a depiction that may be directed to a specific embodiment of a specific invention. Some features described in the contexts of separate embodiments may also be consolidated and implemented in a single embodiment. Alternatively, various features depicted in the context of a single embodiment may also be scattered and implemented in a plurality of embodiments or in any appropriate subcombinations.

Various modifications and changes to the exemplary embodiments of the present disclosure will become apparent to those skilled in the art when viewing the above description along with the accompanying drawings. Any and all modifications will still fall within the scope of the non-limitative exemplary embodiments of the present disclosure. Besides, the above description and drawings have teaching benefits. Those skilled in the art related to these embodiments of the present disclosure will contemplate other embodiments of the present disclosure as illustrated here.

It would be appreciated that the embodiments of the present disclosure are not limited to specific embodiments of the present disclosure, and modifications and other embodiments should all be included within the scope of the appended claims. Although specific terms are used here, they are only used in general and descriptive senses, not for a purpose of limitation.

What is claimed is:

1. A method for implementing multiple operations on a server providing a content management service through a Rest API, the method comprising:
   providing, by the server, a batch service for multiple content management service operations for a content management system, wherein the content management system avoids a requirement to provide batch capabilities;
   sending, to the server, a batch service request for a batch, wherein the batch comprises multiple content management service operations, wherein the multiple content management service operations use the Rest API, wherein sending a batch service request comprises sending one of the following requests consisting from the group of:
   creating and executing a new batch;
   getting all of the created batches;
   getting supported batch features;
   getting the batch;
   changing a state of the batch; and
   removing the batch; and
   receiving, from the server, a batch service response, wherein the batch service response indicates at least one of a state of the batch and a result from executing the batch, wherein receiving the batch service response comprises returning a status code in response to the batch service request indicating one or more features of the batch that are unsupported.

2. The method according to claim 1, wherein getting supported batch features comprises obtaining one or more features from the group consisting of :
   a transactional;
   a non-transactional;
   a transactional and non-transactional;
   a synchronous;
   an asynchronous;

a synchronous and non-synchronous;
a sequential;
a non-sequential;
a sequential and non-sequential;
a failing-on-error;
a continuing-on-error;
a failing-on-error and continuing-on-error;
a removing-on-complete;
a retaining-on-complete;
a removing-on-complete and retaining-on complete;
allowing to halt an asynchronous batch;
not allowing to halt an asynchronous batch;
what resources are allowed for batching; and
what resources are not allowed for batching.

3. The method according to claim 1, wherein the state of the batch comprises one of the following:
an initial state, a running state, a halted state and a completed state.

4. The method according to claim 1, sending a batch service request for a batch comprises sending a batch service request indicating an operating mode of the batch, wherein the operating mode comprises one or more from the group consisting of:
a transactional mode;
a non-transactional mode;
a synchronous mode;
an asynchronous mode;
a sequential mode;
a non-sequential mode;
a failing-on-error;
a continuing-on-error;
a removing-on-complete; or
retaining-on-complete.

5. The method according to claim 1, wherein the content related to each content management service operation comprises a text type or other media type.

6. The method according to claim 1, wherein receiving a batch service response comprises receiving one of the following batch service responses consisting from the group of:
a response to creating and executing a new batch;
a response to getting all of the created batches;
a response to getting supported batch features;
a response to getting the batch;
a response to changing a state of the batch; and
a response to removing the batch.

7. A method for implementing multiple operations on a server providing a content management service through a Rest API, the method comprising:
providing, by the server, a batch service for multiple content management service operations for a content management system, wherein the content management system avoids a requirement to provide batch capabilities;
receiving, by the server, a batch service request for a batch, wherein the batch comprises multiple content management service operations, wherein sending a batch service request comprises sending one of the following requests consisting from the group of:
creating and executing a new batch;
getting all of the created batches;
getting supported batch features;
getting the batch;
changing a state of the batch; and
removing the batch;
executing, by the server, the batch in response to the batch service request, wherein the multiple content management service operations use the Rest API; and
sending, by the server, a batch service response, wherein the batch service response indicates at least one of a state of the batch and a result from executing the batch, wherein sending the batch service response comprises sending a status code in response to the batch service request indicating one or more features of the batch that are unsupported.

8. The method according to claim 7, wherein executing the batch in response to the batch service request comprises executing the batch based on an operating mode of the batch indicated by the batch service request, wherein the operating mode comprises one or more of the following consisting from the group of:
a transactional mode;
a non-transactional mode;
a synchronous mode;
an asynchronous mode;
a sequential mode;
a non-sequential mode;
a failing-on-error mode;
a continuing-on-error mode;
a removing-on-complete mode; or
retaining-on-complete mode.

9. An apparatus for implementing multiple operations on a server providing a content management service through a Rest API, wherein the server comprising computer-executable logic operating in memory, wherein the computer-executable program logic is configured to enable execution across one or more processors and configured to:
provide, by the server, a batch service for multiple content management service operations for a content management system, wherein the content management system avoids a requirement to provide batch capabilities;
send, to the server, a batch service request for a batch, wherein the batch comprises multiple content management service operations, wherein the multiple content management service operations use the Rest API, wherein the batch service request includes a request for each content management service operation, wherein sending a batch service request comprises sending one of the following requests consisting from the group of:
creating and executing a new batch;
getting all of the created batches;
getting supported batch features;
getting the batch;
changing a state of the batch;
removing the batch; and
receive, from the server, a batch service response, wherein the batch service response indicates at least one of a state of the batch and a result from executing the batch, wherein receiving the batch service response comprises returning a status code in response to the batch service request indicating one or more features of the batch that are unsupported.

10. The apparatus according to claim 9, wherein getting supported batch features comprises obtaining one or more features from the group consisting of:
a transactional;
anon-transactional;
a transactional and non-transactional;
a synchronous;
an asynchronous;
a synchronous and non-synchronous;
a sequential;
a non-sequential;
a sequential and non-sequential;
a failing-on-error;

a continuing-on-error;
a failing-on-error and continuing-on-error;
a removing-on-complete;
a retaining-on-complete;
a removing-on-complete and retaining-on complete;
allowing to halt an asynchronous batch;
not allowing to halt an asynchronous batch;
what resources are allowed for batching; and
what resources are not allowed for batching.

11. The apparatus according to claim 9, wherein the state of the batch comprises one of the following:
  an initial state, a running state, a halted state and a completed state.

12. The apparatus according to claim 9, wherein sending a batch service request for a batch comprises sending a batch service request indicating an operating mode of the batch, wherein the operating mode comprises one or more from the group consisting of:
  a transactional mode;
  a non-transactional mode;
  a synchronous mode;
  an asynchronous mode;
  a sequential mode;
  a non-sequential mode;
  a failing-on-error;
  a continuing-on-error;
  a removing-on-complete; or
  retaining-on-complete.

13. The apparatus according to claim 9, wherein the content related to each content management service operation comprises a text type or other media type.

14. The apparatus according to claim 9, wherein the response receiving unit receives one of the following batch service responses consisting from the group of:
  a response to creating and executing a new batch;
  a response to getting all of the created batches;
  a response to getting supported batch features;
  a response to getting the batch;
  a response to changing a state of the batch; and
  a response to removing the batch.

* * * * *